United States Patent [19]
Raab

[11] Patent Number: 5,510,977
[45] Date of Patent: Apr. 23, 1996

[54] METHOD AND APPARATUS FOR MEASURING FEATURES OF A PART OR ITEM

[75] Inventor: Simon Raab, Longwood, Fla.

[73] Assignee: Faro Technologies Inc., Lake Mary, Fla.

[21] Appl. No.: 284,397

[22] Filed: Aug. 2, 1994

[51] Int. Cl.$^6$ .......................... G05B 19/401; G06F 19/00
[52] U.S. Cl. ................. 364/167.01; 33/503; 364/551.02; 364/474.37
[58] Field of Search .......................... 364/474.37, 551.01, 364/551.02, 559, 167.01, 560, 561, 562, 571.01; 33/502, 503, 504, 567, 567.1, 626; 395/89, 93, 94; 901/44, 45, 46, 47

[56] References Cited

U.S. PATENT DOCUMENTS

| | | | |
|---|---|---|---|
| 2,906,179 | 9/1959 | Bower | 33/503 |
| 3,531,868 | 10/1970 | Stevenson | 33/503 |
| 3,944,798 | 3/1976 | Eaton | 33/174 PC |
| 4,384,407 | 5/1983 | Miyamoto | 33/174 P |
| 4,430,796 | 2/1984 | Nakagawa | 33/121 |
| 4,653,011 | 3/1987 | Iwano | 33/503 |
| 4,703,443 | 10/1987 | Moriyasu | 364/559 |
| 4,769,763 | 9/1988 | Trieb et al. | 364/559 |
| 4,819,195 | 4/1989 | Bell et al. | 364/571.05 |
| 4,891,889 | 1/1990 | Tomelleri | 33/503 |
| 4,945,501 | 7/1990 | Bell et al. | 364/571.05 |
| 4,991,579 | 2/1991 | Allen | 606/130 X |
| 5,040,306 | 8/1991 | McMurtry et al. | 33/556 |
| 5,083,073 | 1/1992 | Kato | 395/89 |
| 5,088,046 | 2/1992 | McMurtry | 364/474.03 |
| 5,088,055 | 2/1992 | Oyama | 364/560 |
| 5,105,368 | 4/1992 | Alexandersen et al. | 395/89 |
| 5,131,844 | 7/1992 | Marinaccio et al. | 33/503 |
| 5,148,377 | 9/1992 | McDonald | 33/560 |
| 5,189,806 | 3/1993 | McMurtry et al. | 33/503 |
| 5,204,824 | 4/1993 | Fujimaki | 364/474.03 |
| 5,230,338 | 7/1993 | Allen et al. | 606/130 X |
| 5,259,120 | 11/1993 | Chapman et al. | 33/502 |
| 5,305,203 | 4/1994 | Raab | 364/413.13 |

OTHER PUBLICATIONS

FARO Technologies Inc., FARO Metrecom, 1992.

Primary Examiner—Joseph Ruggiero
Attorney, Agent, or Firm—Fishman, Dionne & Cantor

[57] ABSTRACT

An apparatus for measuring position and orientation of features of a part or item, using a portable coordinate measuring machine (CMM) is presented. A master or standard reference file for the part and its features is generated. Equivalents are manufactured to match the features of the part to be measured. The CMM is positioned within reach of the part. A coordinated system is defined either relative to the part to be measured or to the overall assembly. The equivalent is held in position by an operator. The dimensions of the equivalent and the position of a measurement hole in the equivalent are known and are accounted for by the computer when measurements are taken. The probe of the CMM is used to digitize the position of measurement hole, thereby digitizing that feature of the part. It will be appreciated that all the features of the part for which measurement is desired are digitized in this manner. These digitized positions for each feature are stored in the computer memory and compared to the reference file.

32 Claims, 5 Drawing Sheets

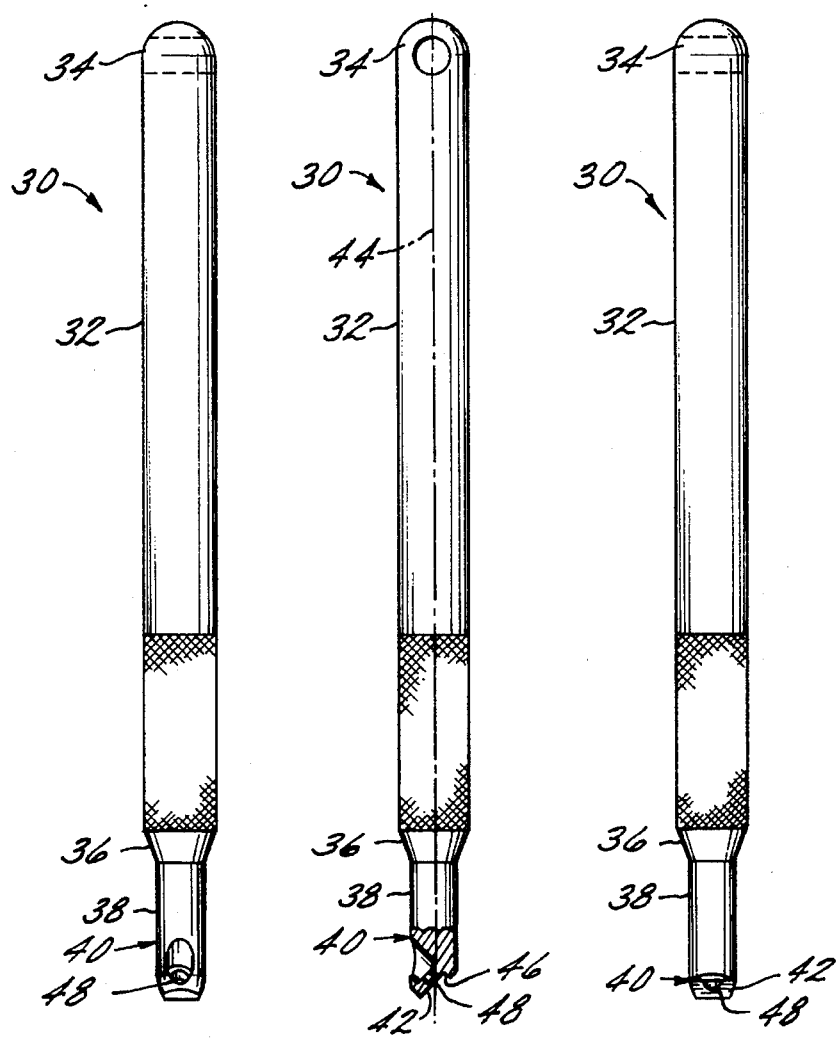

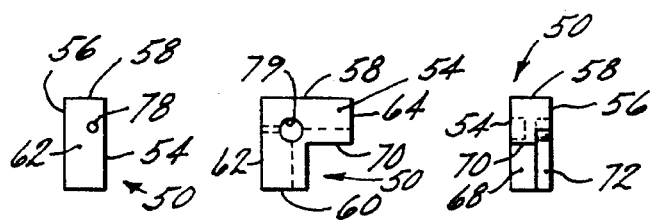
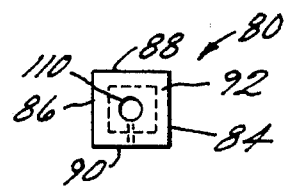
FIG. 4D  FIG. 4A  FIG. 4E  FIG. 5C
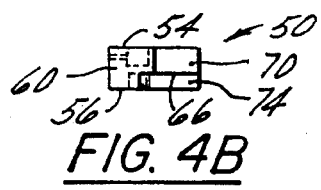
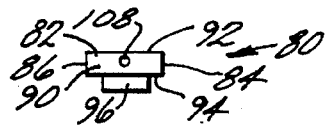
FIG. 4B  FIG. 5B
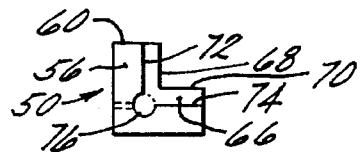
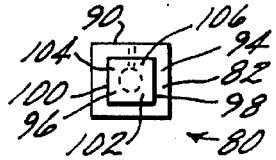
FIG. 4C  FIG. 5A
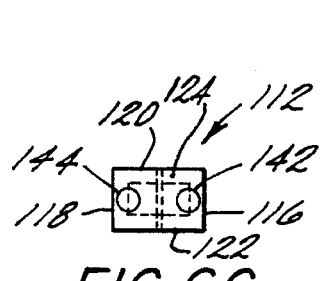
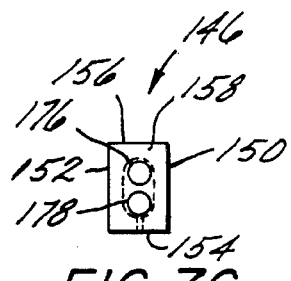
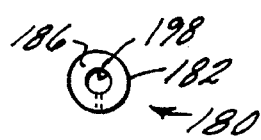
FIG. 6C  FIG. 7C  FIG. 8C
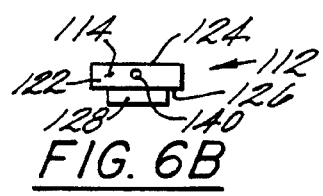
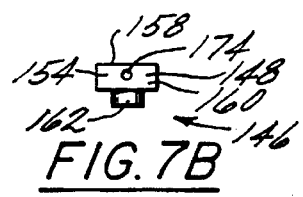
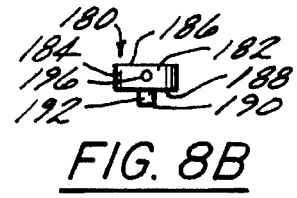
FIG. 6B  FIG. 7B  FIG. 8B
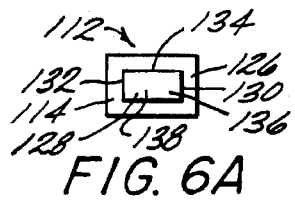
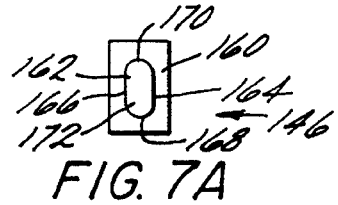
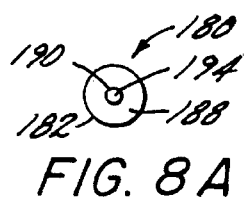
FIG. 6A  FIG. 7A  FIG. 8A

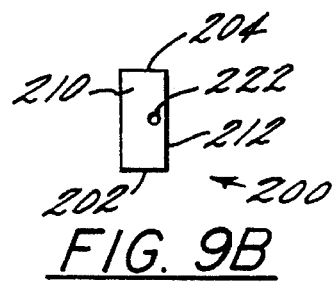
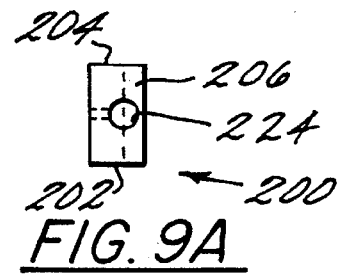
FIG. 9B  FIG. 9A
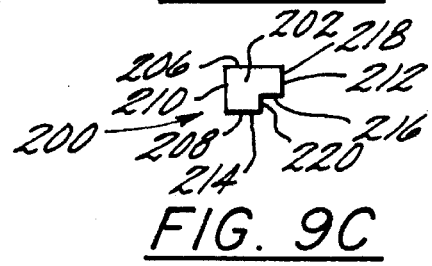
FIG. 9C
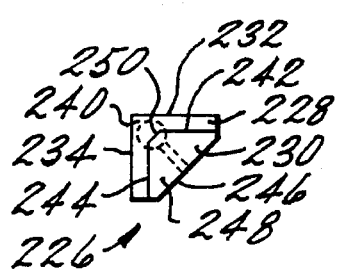
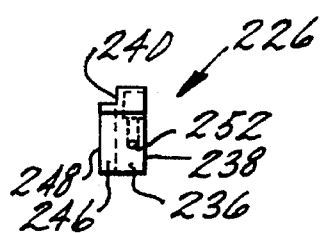
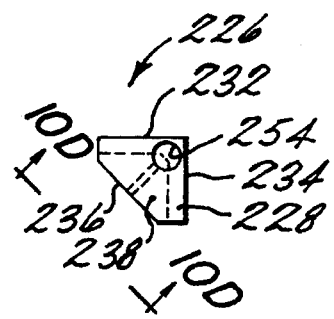
FIG. 10C  FIG. 10B  FIG. 10A
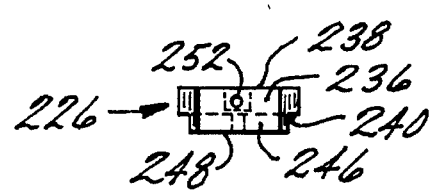
FIG. 10D

METHOD AND APPARATUS FOR MEASURING FEATURES OF A PART OR ITEM

BACKGROUND OF THE INVENTION

This invention relates generally to a method and apparatus for measuring position and orientation of features of a part or item. More specifically, the present invention relates to a method and apparatus for measuring position and orientation of features of a part or item, using a portable coordinate measuring machine (CMM).

The methodology used for measuring sheet metal features is complex due to the typically curved and complex nature of these features. The complexity of these features is compounded by the thinness of the metal sheets which makes it difficult to properly measure the position of edges using conventional measurement techniques. One of the two methods most commonly used today is check fixtures which are assemblages of posts, rests, clamps, etc. onto which the sheet metal part is placed and visual examination is made to seek variations between the hard fixture and the sheet metal part. This method is typically nonanalytical and is prone to significant setup error. It is also fundamentally a subjective process. The other method, which is the most commonly used for quality control of sheet metal parts, is the checking of a percentage of the parts on a computer controlled CMM. The use of a manual CMM is extremely infrequent. The reasons for this are explained as follows.

Since a CMM probe requires compensation for its probe thickness, it is necessary to establish vectors, normal to surfaces, and/or edges in order to define a direction of probe compensation. This process usually entails numerous hits. A hit is defined as the measurement of a location of the probe. Numerous hits are required in order to define surface vectors; for example, three hits on a surface to define a plane and, therefore, the normal to surface; two hits near an edge to define a normal to an edge. This multiplicity of hits is time consuming and makes the process prone to system crashes. A system crash on a computer controlled CMM is usually caused by variations in the part for which the programmed CMM motion is not adapted. This will result in unexpected probe contact with the surface (i.e., crashes) and, therefore, require reprogramming of the system. The multiple hits and their planning is also an extremely complex process, usually requiring off-line CMM simulation software and significant trial and error.

Further, it will be appreciated that everything in the physical world occupies volume or space. Position in a space may be defined by length, width and height which, in engineering terms, is often called an X, Y, Z coordinate. The X, Y, Z numbers represent the dimensions of length, width and height or three dimensions. Three-dimensional objects are described in terms of position and orientation; that is, not just where an object is but in what direction it points. The orientation of an object in space can be defined by the position of three points on the object. Orientation can also be described by the angles of alignment of the object in space. The X, Y, and Z coordinates can be most simply measured by three linear scales. In other words, if you lay a scale along the length, width and height of a space, you can measure the position of a point in the space.

SUMMARY OF THE INVENTION

The above-discussed and other problems and deficiencies of the prior art are overcome or alleviated by the method and apparatus for measuring position and orientation of features of a part or item, using a portable coordinate measuring machine is presented. The coordinate measuring machine (e.g., the CMM described in U.S. patent application Ser. No. 08/021,949, now U.S. Pat. No. 5,402,582) comprises a multijointed (preferably six joints) manually positionable measuring arm for accurately and easily measuring the position of one or more measurement holes on an equivalent.

The equivalent has a handle attached thereto for holding the equivalent in position during measurement. The equivalent has a geometrical shape designed to match a feature of a part or item. By way of example, equivalents having geometrical shapes to match the following features; an outside corner, a square hole, a rectangular hole, an oval hole, a round or circular hole, an edge and an inside corner may be used.

The part or item having features to be measured may be a sheet metal, such as an automobile panel (prior to or after mounting to an automobile) or any other application for sheet metal (e.g., appliances or enclosures). Further, the part may be comprised of any suitable material, for example, plastic or fiberglass. A master or standard reference file for the part and its features is generated in CAD (computer aided design) data, as is well known and as such is generally generated prior to the manufacture (i.e., stamping, cutting, bending or punching) of the part. The information in the CAD data file includes information on exact three-dimensional location, orientation and shape of the part and each of its features. Equivalents are manufactured to match (i.e., conform to) the features of the part to be measured. The CMM is positioned within reach of the part. A coordinate system is defined either relative to the part to be measured or to the overall assembly (e.g., a panel mounted on an automobile), as is known. The equivalent is held in position at the handle by one hand of an operator. The dimensions of the equivalent and the position of the measurement hole in the equivalent are known and are accounted for by the computer when measurements are taken. The probe (which is held by the other hand of the operator) of the CMM is used to digitize the position of measurement hole, thereby digitizing that feature of the part. It will be appreciated that all the features of the part for which measurement is desired are digitized in this manner. These digitized positions for each feature are stored in the computer memory and compared to the reference file. It will be appreciated, that where a CAD reference file is not available, one can be created by measurement of features on a master part (template).

The present invention avoids the prior art method's necessity for up to eight or nine separate hits for a typical round ended slot and only a single or double hit is required.

The above-discussed and other features and advantages of the present invention will be appreciated and understood by those skilled in the art from the following detailed description and drawings.

BRIEF DESCRIPTION OF THE DRAWINGS

Referring to the drawings, wherein like elements are numbered alike in the several Figures:

FIGS. 2A–D are side views of a handle for an equivalent in accordance with the present invention wherein FIG. 2A is a side elevation view thereof, FIG. 2B is another side elevation view thereof partly in cross section, FIG. 2C is still another side elevation view thereof, and FIG. 2D is an end view thereof;

FIG. 3 is a side view of the handle of FIGS. 2A–D connected to an equivalent in accordance with the present invention;

FIGS. 4A–E are views of an outside corner equivalent in accordance with the present invention wherein FIG. 4A is a first side view thereof, FIG. 4B is bottom view thereof, FIG. 4C is a second side view thereof, FIG. 4D is a rear view thereof, and FIG. 4E is a front view thereof;

FIGS. 5A–C are views of a square hole equivalent in accordance with the present invention wherein FIG. 5A is bottom view thereof, FIG. 5B is a side view thereof, and FIG. 5C is a top view thereof;

FIGS. 6A–C are views of a rectangular hole equivalent in accordance with the present invention wherein FIG. 6A is bottom view thereof, FIG. 6B is a side view thereof, and FIG. 6C is a top view thereof;

FIGS. 7A–C are views of an oval hole equivalent in accordance with the present invention wherein FIG. 7A is bottom view thereof, FIG. 7B is a side view thereof, and FIG. 7C is a top view thereof;

FIGS. 8A–C are views of a round or circular hole equivalent in accordance with the present invention wherein FIG. 8A is bottom view thereof, FIG. 8B is a side view thereof, and FIG. 8C is a top view thereof;

FIGS. 9A–C are views of an edge equivalent in accordance with the present invention wherein FIG. 9A is top view thereof, FIG. 9B is a rear view thereof, and FIG. 9C is a side view thereof;

FIGS. 10A–D are views of an inside corner equivalent in accordance with the present invention wherein FIG. 10A is top view thereof, FIG. 10B is a first side view thereof, FIG. 10C is a bottom view thereof, and FIG. 10D is a second side view thereof.

DESCRIPTION OF THE PREFERRED EMBODIMENT

Figure 1:
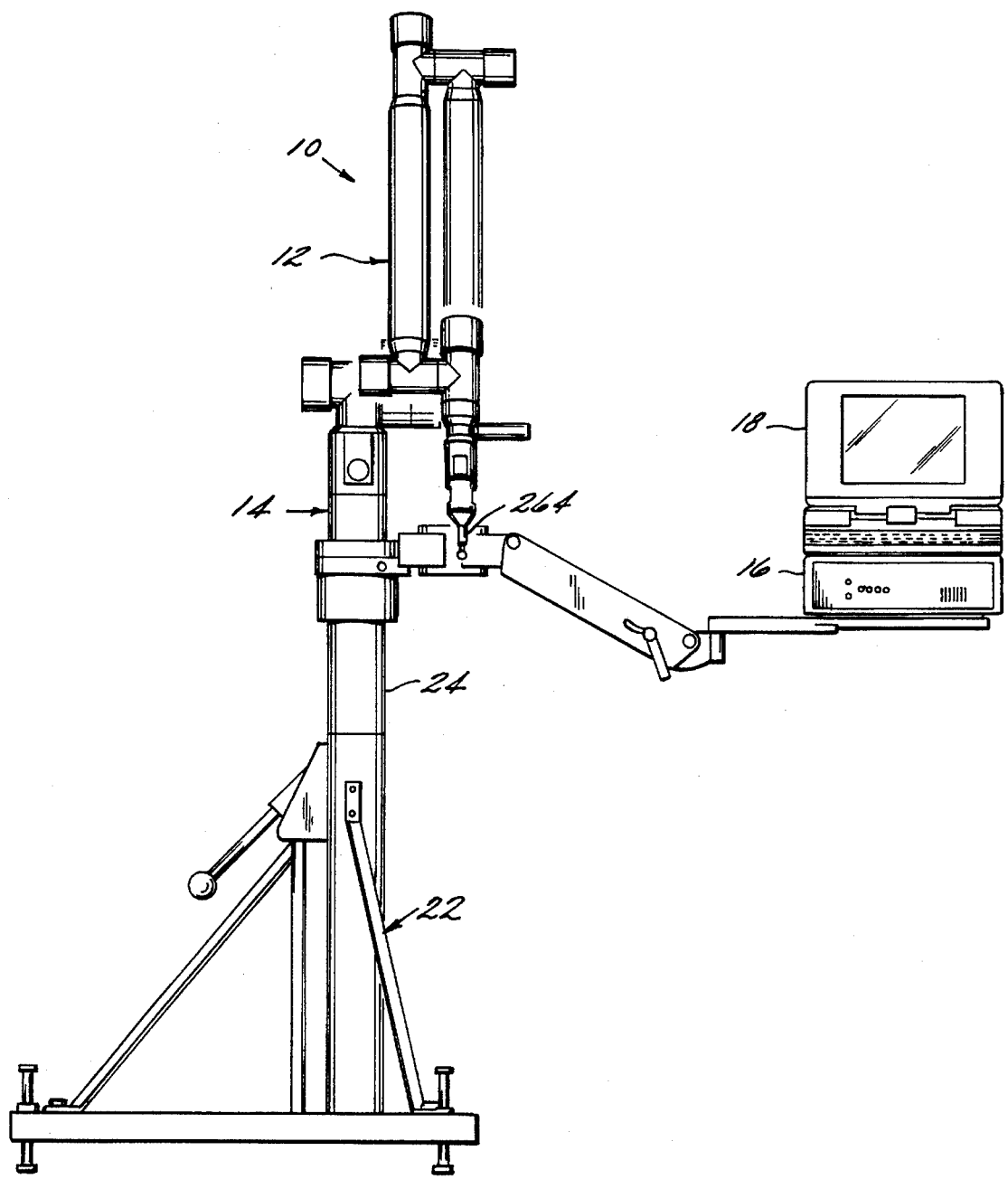
FIG. 1 is a side diagrammatic view depicting the three dimensional measuring system including a coordinate measuring machine (CMM), a controller box and a host computer.

Referring first to FIG. 1, a three dimensional measuring system for use in the present invention generally comprises a coordinate measuring machine (CMM) 10 composed of a manually operated multijointed arm 12 and a support base or post 14, a controller or serial box 16 and a host computer 18. It will be appreciated that CMM 10 electronically communicates with serial box 16 which, in turn, electronically communicates with host computer 18.

CMM 10 includes transducers (e.g., one transducer for each degree of freedom) which gather rotational positioning data and forward this basic data to serial box 16. Serial box 16 provides a reduction in the overall requirements of host computer 18 to handle certain complex calculations and provides certain preliminary data manipulations. Basic transducer data is sent from CMM 10 to serial box 16, Serial box 16 then processes the raw transducer data on an ongoing basis and responds to the queries of the host computer with the desired three-dimensional positional or orientational information.

Preferably, all three components defining the three dimensional measuring system of this invention (e.g., CMM 10, serial box 16 and host computer 18) are mounted on either a fixed mounting surface using a rigid plate and/or a standard optical measurement instrument thread followed by mounting on a known and standard theodolite mobile stand, such as part no. MWS750 manufactured by Brunson. Such a mobile stand is characterized by a stable rolling platform with an extendable vertical tower and with common attachments and locking mechanisms.

While the above generally describes the coordinate measuring machine of U.S. patent application Ser. No. 08/021,949, now U.S. Pat. No. 5,402,582, which is incorporated herein by reference, such a high accuracy measuring device, may in some applications not be required. In such applications the aforementioned METRECOM MODEL: IND-01 Coordinate Measuring Machine commercially available from FARO Technologies, Inc., Industrial Division, 125 Technology Park, Lake Mary, Fla. 32746 (assignee of the present invention) may be employed. The METRECOM system performs the same functions as the above described system, however with reduced accuracy and at a reduced cost.

A CMM (e.g., as described above with reference to U.S. patent application Ser. No. 08/021,949, the METRECOM Model: IND-01, other commercially available CMM) is used to measure the position of devices having geometrical shapes which are designed to match features of a work piece (e.g., a formed piece of sheet metal, such as a automobile door panel), these devices are referred to herein as "equivalents" and are discussed more fully below.

Referring to FIGS. 2A–D, a universal handle assembly for use with various equivalents is shown generally at 30. Handle 30 comprises an elongated shaft 32 having a rounded end portion 34 and a narrowing tapered end portion 36. A portion of the shaft near end 36 is preferably knurled, as is known. A narrowed shaft portion 38 depends from end 36 and terminates at the distal end 40 thereof with means for attaching an equivalent thereto. End 40 comprises a flat surface 42 which is disposed at about a forty-five degree angle relative to the center axis 44 of handle 30. This angle is believed to provide a convenient or ergonomically correct position of the handle during use (the handle having an equivalent attached thereto). End 40 further comprises a second flat surface 46 perpendicularly depending from one end of surface 42. A screw mounting hole 48 extends through portion 38 and surface 42 with hole 48 being countersunk at the outer surface of portion 38.

Referring to FIGS. 3 and 4A–E, handle 30 is attached to a device 50, referred to herein as an equivalent, by a screw 52. Equivalent 50 has a geometrical shape designed to match outside corner features of a work piece. Equivalent 50 has generally an inverted L shape and comprises a side surface 54, a stepped side surface 56, a top surface 58, a stepped bottom surface 60, a rear surface 62, and a two-way stepped front surface 64. Stepped side surface 56 is defined by portions 64 and 66. Two-way stepped front surface 64 is defined by portions 68 and 70, and portions 72 and 74. The corner defined by the intersection of portions 72 and 74 is a recessed arcuate surface 76 which will allow for minor tolerance variations in the actual corner of the work piece. It will be appreciated that the equivalent feature is defined by portions 66, 72 and 74. Rear surface 62 has a tapped screw hole 78 therein for accepting screw 52 (FIG. 3). When equivalent 50 is attached to handle 30 surface 58 of the equivalent abuts surface 46 of the handle and surface 62 of the equivalent abuts surface 42 of the handle. A measurement hole 79 is provided in side surface 54 and is centered to be in alignment with the corner of the equivalent feature, the function of which will be described hereinafter.

Referring to FIGS. 5A–C, an equivalent which has a geometrical shape designed to match a square hole in a work piece is shown generally at 80. Equivalent 80 comprises a first square portion 82 having a thickness at least equal to the length of surface 42 of handle 30 to assure that the handle is sufficiently cleared from the work piece when attached to the equivalent during measurement. Portion 82 has four side surfaces 84, 86, 88, 90, an upper surface 92 and a lower surface 94. A second smaller square portion 96 depends from about the center of the lower surface 94 of portion 82. Portion 96 has four side surfaces 98, 100, 102, 104 and a lower surface 106. It will be appreciated that the equivalent feature is defined by portion 96. Surface 90 has a tapped screw hole 108 therein for accepting screw 52 (similar to FIG. 3). When equivalent 80 is attached to handle 30 surface 92 of the equivalent abuts surface 46 of the handle and surface 90 of the equivalent abuts surface 42 of the handle. A measurement hole 110 is provided in upper surface 92 at about the center thereof, the function of which will be described hereinafter.

Referring to FIGS. 6A–C, an equivalent which has a geometrical shape designed to match a rectangular hole in a work piece is shown generally at 112. Equivalent 112 comprises a first rectangular portion 114 having a thickness at least equal to the length of surface 42 of handle 30 to assure that the handle is sufficiently cleared from the work piece when attached to the equivalent during measurement. Portion 114 has four side surfaces 116, 118, 120, 122, an upper surface 124 and a lower surface 126. A second smaller rectangular portion 128 depends from about the center of the lower surface 126 of portion 114. Portion 128 has four side surfaces 130, 132, 134, 136 and a lower surface 138. It will be appreciated that the equivalent feature is defined by portion 128. Surface 122 has a tapped screw hole 140 therein for accepting screw 52 (similar to FIG. 3). When equivalent 112 is attached to handle 30 surface 124 of the equivalent abuts surface 46 of the handle and surface 122 of the equivalent abuts surface 42 of the handle. Two measurement holes 142, 144 are provided in upper surface 124 with the center of each hole being in general alignment with about the center of corresponding side surface 130, 132, the function of the measurement holes will be described hereinafter.

Referring to FIGS. 7A–C, an equivalent which has a geometrical shape designed to match an oval hole in a work piece is shown generally at 146. Equivalent 146 comprises a first rectangular portion 148 having a thickness at least equal to the length of surface 42 of handle 30 to assure that the handle is sufficiently cleared from the work piece when attached to the equivalent during measurement. Portion 148 has four side surfaces 150, 152, 154, 156, an upper surface 158 and a lower surface 160. A second smaller oval portion 162 depends from about the center of the lower surface 160 of portion 148. Portion 162 has two side surfaces 164, 166, two curved or arcuate side surfaces 168, 170 and a lower surface 172. It will be appreciated that the equivalent feature is defined by portion 162. Surface 154 has a tapped screw hole 174 therein for accepting screw 52 (similar to FIG. 3). When equivalent 146 is attached to handle 30 surface 158 of the equivalent abuts surface 46 of the handle and surface 154 of the equivalent abuts surface 42 of the handle. Two measurement holes 176, 178 are provided in upper surface 124 with a portion of the circumference of each hole being in general alignment with the corresponding curved side surface 168, 170, whereby one half of the circumference of each hole closely approximates and aligns with the curvature of corresponding surface 168, 170, the function of the measurement holes will be described hereinafter.

Referring to FIGS. 8A–C, an equivalent which has a geometrical shape designed to match a round or circular hole in a work piece is shown generally at 180. Equivalent 180 comprises a first cylindrical portion 182 having a thickness at least equal to the length of surface 42 of handle 30 to assure that the handle is sufficiently cleared from the work piece when attached to the equivalent during measurement. Portion 182 has a circumferential side surface 184, an upper surface 186 and a lower surface 188. A second smaller cylindrical portion 190 depends from about the center of the lower surface 188 of portion 182. Portion 190 has a circumferential side surface 192 and a lower surface 194. It will be appreciated that the equivalent feature is defined by portion 190. Surface 184 has a tapped screw hole 196 therein for accepting screw 52 (similar to FIG. 3). When equivalent 180 is attached to handle 30 surface 186 of the equivalent abuts surface 46 of the handle and surface 184 of the equivalent abuts surface 42 of the handle. A measurement hole 198 is provided in upper surface 186 at about the center thereof, the function of the measurement holes will be described hereinafter.

Referring to FIGS. 9A–C, an equivalent which has a geometrical shape designed to match an edge features of a work piece is shown generally at 200. Equivalent 200 has generally an inverted L shape and comprises a side surfaces 202 and 204, a top surface 206, a stepped bottom surface 208, a rear surface 210, and a stepped front surface 212. Stepped bottom surface 208 is defined by portions 214 and 216. Stepped front surface 212 is defined by portions 218 and 220. It will be appreciated that the equivalent feature is defined by portions 216 and 220. Rear surface 210 has a tapped screw hole 222 therein for accepting screw 52 (FIG. 3). When equivalent 200 is attached to handle 30 surface 204 of the equivalent abuts surface 46 of the handle and surface 210 of the equivalent abuts surface 42 of the handle. A measurement hole 224 is provided in top surface 206 and is centered to be in alignment with the edge of the equivalent feature (i.e., the intersection of portions 216 and 220), the function of which will be described hereinafter.

Referring to FIGS. 10A–D, an equivalent which has a geometrical shape designed to match inside corner features of a work piece is shown generally at 226. Equivalent 226 comprises an upper generally triangularly shaped portion 228 and a smaller, lower generally triangularly shaped portion 230. Portion 228 comprises side surfaces 232, 234 and 236, upper surface 238 and lower surface 240. Portion 230 depends from surface 240 of portion 228 and comprises side surfaces 242, 244 and 246 and lower surface 248. The corner 250 defined by portion 230 ground down to allow for minor tolerance variations in the actual corner of the work piece. It will be appreciated that the equivalent feature is defined by portion 230, and more specifically the intersection of sides 242 and 244. Surface 236 has a tapped hole 252 therein for accepting screw 52 (FIG. 3). When equivalent 226 is attached to handle 30 surface 238 of the equivalent abuts surface 46 of the handle and surface 236 of the equivalent abuts surface 42 of the handle. A measurement hole 254 is provided in upper surface 238 and is centered to be in alignment with the corner of the equivalent feature, the function of which will be described hereinafter.

Figure 11:
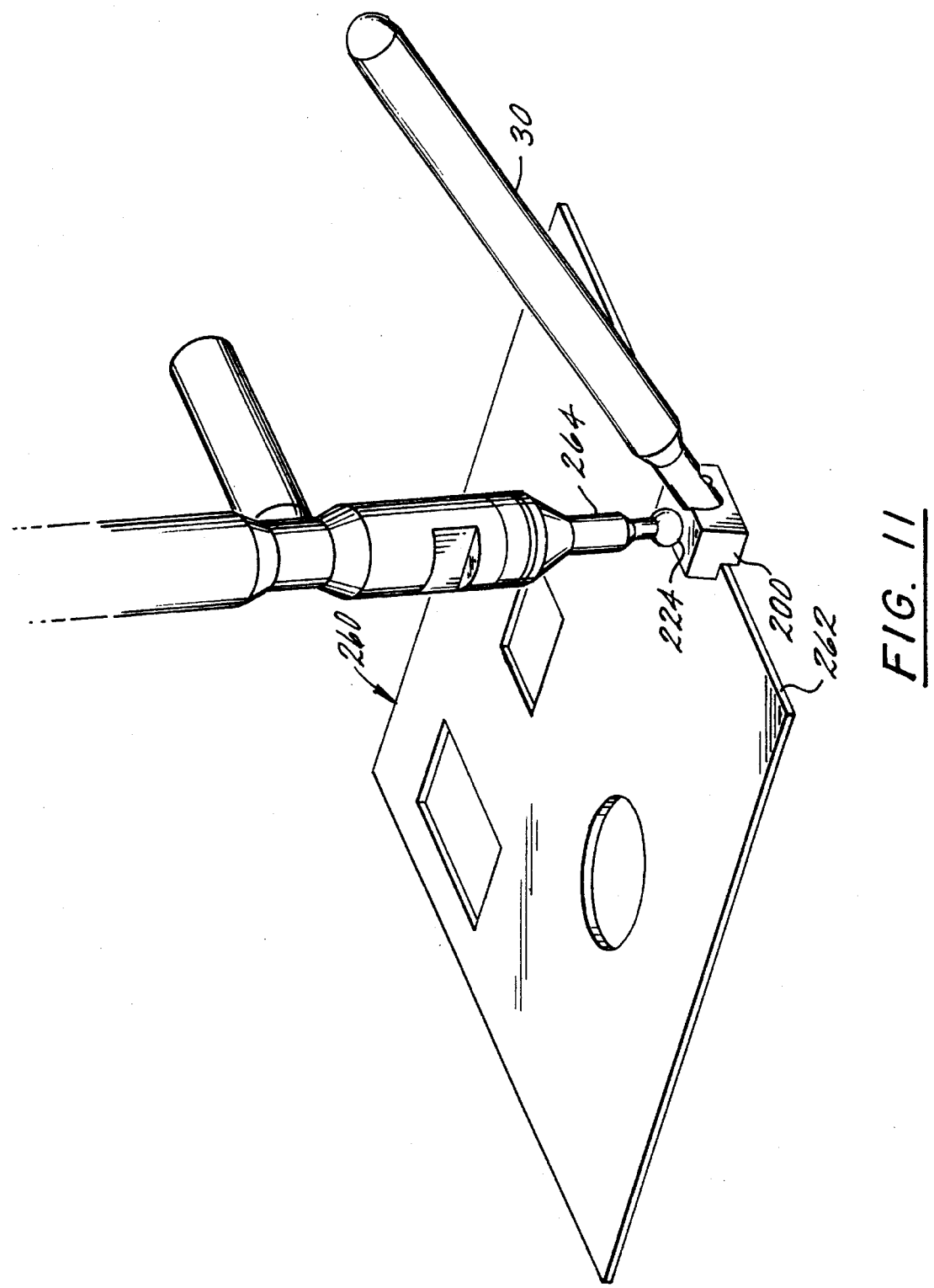
FIG. 11 is a perspective diagrammatic view of the edge equivalent of FIGS. 9A–C attached to the handle of FIGS. 2A–D positioned on an edge feature of a part being measured by the CMM of FIG. 1 in accordance with a method of the present invention.

Referring now to FIG. 11, a sheet metal having typical features is shown generally at 260. Sheet 260 may be an automobile panel (prior to or after mounting to an automobile) or any other application for sheet metal (e.g., appliances or enclosures). Further, sheet 260 may be comprised of any suitable material, for example, plastic or fiberglass. A master or standard reference file for the sheet metal and its features is generated in CAD (computer aided design) data, as is well known and as such is generally generated prior to the manufacture (i.e., stamping, cutting, bending or punching) of sheet metal 260. The information in the CAD data file includes information on exact three-dimensional location, orientation and shape of the sheet and each of its features. Equivalents are manufactured, such as described hereinbefore, to match the features of the sheet to be measured, and such features are not in any way limited to the above described features. CMM 10 is positioned within reach of sheet 260. A coordinate system is defined either relative to the sheet (i.e., the item or part to be measured) or the overall assembly of which the sheet is a part thereof (e.g., a panel mounted on an automobile), as is known. By way of example only, edge equivalent 200 mounted to handle 30, as described hereinbefore, is shown positioned for measurement of an edge feature 262 of the sheet. The equivalent is held in position at the handle by one hand of an operator. The dimensions of the equivalent and the position of the measurement hole 224 are known and are accounted for by the computer when measurements are taken. The probe 264 (which is held by the other hand of the operator) of CMM 10 is used to digitize the position of measurement hole 224, thereby digitizing that feature of the sheet. It will be appreciated that the entire edge as well as all other features of the sheet for which measurement is desired are digitized as described above. These digitized positions for each feature are stored in the computer memory and compared to the reference file, whereby the position and orientation of each feature is verified, for example, for quality assurance purposes. It will be appreciated, that where a CAD reference file is not available, one can be created by measurement of features on a master sheet (template or part)using the above described method of the present invention.

The measurement holes in the present example are 0.200 inches in diameter, since the probe of the above-described CMM as a diameter of 0.250 inches. It will be appreciated that the diameter of the measurement holes will be sized in accordance with the probe diameter and that the above is only exemplary.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of measuring position and orientation of at least one feature of an item using a dimensional coordinate measuring system having a probe for digitizing coordinates, the method comprising the steps of:

providing an equivalent having a geometrical shape which conforms to the feature being measured, said equivalent having a measurement element, said measurement element being aligned relative to said geometrical shape of said equivalent;

establishing a reference coordinate system;

positioning said geometrical shape of said equivalent at the feature being measured; and probing said measurement element in said equivalent using said probe to provide a digitized coordinate relative to said reference coordinate system, said digitized coordinate corresponding to a position of said measurement element in said equivalent, whereby the position and orientation of the feature is provided.

2. The method of claim 1 wherein said reference coordinate system is estabfished relative to the item being measured.

3. The method of claim 1 wherein said reference coordinate system is established relative to an assembly of which the item being measured is a part thereof.

4. The method of claim 1 wherein said item comprises a sheet metal part.

5. The method of claim 1 wherein said dimensional coordinate measuring system comprises a three dimensional coordinate measuring system comprising:

a movable arm having opposed first and second ends, said arm including a plurality ofjoints with each joint corresponding to a degree of freedom, each of said joints including a rotational setup tool housing for housing position transducer means, said transducer means producing a position signal;

a support base attached to said first end of said movable arm;

said probe attached to said second end of said movable arm; and means for receiving said position signals from said transducer means and providing a digital coordinate corresponding to the position of said probe.

6. A method of verifying position and orientation of at least one feature of an item using a dimensional coordinate measuring system having a probe for digitizing coordinates, the method comprising the steps of:

establishing a known reference position and orientation of the feature being verified;

providing an equivalent having a geometrical shape which conforms to the feature being verified, said equivalent having a measurement element, said measurement element being aligned relative to said geometrical shape of said equivalent;

establishing a reference coordinate system;

positioning said geometrical shape of said equivalent at the feature being verified;

probing said measurement element in said equivalent using said probe to provide a digitized coordinate relative to said reference coordinate system, said digitized coordinate corresponding to a position of said measurement element in said equivalent, whereby a measured position and orientation of the feature is provided; and comparing said measured position and orientation of the feature to said reference position and orientation of the feature, whereby the position and orientation of the feature are verified.

7. The method of claim 6 wherein said step of establishing said known reference position and orientation of the feature being verified comprises:

computer aided design information of the feature.

8. The method of claim 6 wherein said step of establishing said known reference position and orientation of the feature being verified comprises the step of:

measuring position and orientation of the feature on a master item using the dimensional coordinate measuring system comprising, positioning said geometrical shape of said equivalent at the feature of the master item being measured, and probing said measurement element in said equivalent using said probe to provide a master digitized coordinate relative to said reference coordinate system, said master digitized coordinate corresponding to a position of said measurement element in said equivalent, whereby said reference position and orientation of the feature is provided.

9. The method of claim 6 wherein said reference coordinate system is established relative to the item being measured.

10. The method of claim 6 wherein said reference coordinate system is established relative to an assembly of which the item being measured is a part thereof.

11. The method of claim 6 wherein said item comprises a sheet metal part.

12. The method of claim 6 wherein said dimensional coordinate measuring system comprises a three dimensional coordinate measuring system comprising:
   a movable arm having opposed first and second ends, said arm including a plurality of joints with each joint corresponding to a degree of freedom, each of said joints including a rotational setup tool housing for housing position transducer means, said transducer means producing a position signal;
   a support base attached to said first end of said movable arm;
   said probe attached to said second end of said movable arm; and
   means for receiving said position signals from said transducer means and providing a digital coordinate corresponding to the position of said probe.

13. An apparatus for measuring position and orientation of a feature of an item comprising:
   an equivalent tool having a geometrical shape which conforms to the feature to be measured, said equivalent tool having a measurement element, said measurement element being aligned relative to said geometrical shape of said equivalent tool, said equivalent tool to be positioned at the feature; and
   a dimensional coordinate measuring system to be posiiioned relative to said equivalent tool, said dimensional coordinate measuring system having a probe for measuring said measurement element on said equivalent tool, whereby to position and orientation of the feature is measured.

14. The apparatus of claim 13 wherein said equivalent tool comprises:
   a handle; and
   an equivalent attached at on end of said handle, said equivalent including said geometric shape and said measurement element.

15. The apparatus of claim 13 wherein said geometrical shape conforms to an edge feature.

16. The apparatus of claim 15 wherein said measurement hole has a diameter which is aligned with said geometrical shape conforming to said edge feature.

17. The apparatus of claim 13 wherein said geometrical shape conforms to an outside corner feature.

18. The apparatus of claim 17 wherein said measurement element has a center which is aligned with said geometrical shape conforming to said outside corner feature.

19. The apparatus of claim 13 wherein said geometrical shape conforms to an inside corner feature, a round hole feature.

20. The apparatus of claim 19 wherein said measurement element has a center which is aligned with said geometrical shape conforming to said inside corner feature.

21. The apparatus of claim 13 wherein said geometrical shape conforms to a round hole feature.

22. The apparatus of claim 21 wherein said measurement element has a center which is aligned with the center of said geometrical shape conforming to said round hole feature.

23. The apparatus of claim 13 wherein said geometrical shape conforms to a square hole feature.

24. The apparatus of claim 23 wherein said measurement element has a center which is aligned with the center of said geometrical shape conforming to said square hole feature.

25. The apparatus of claim 13 wherein said geometrical shape conforms to an oval hole feature.

26. The apparatus of claim 25 wherein said measurement element comprises two measurement holes each having about one half of its circumference aligned with the periphery of said geometrical shape conforming to said oval hole feature.

27. The apparatus of claim 13 wherein said geometrical shape conforms to a rectangular hole feature.

28. The apparatus of claim 27 wherein said measurement element comprises two measurement holes each centered within a corresponding one half of said geometrical shape conforming to said rectangular hole feature.

29. The apparatus of claim 13 wherein said dimensional coordinate measuring system comprises a three dimensional coordinate measuring system comprising:
   a movable arm having opposed first and second ends, said arm including a plurality ofjoints with each joint corresponding to a degree of freedom, each of said joints including a rotational setup tool housing for housing position transducer means, said transducer means producing a position signal;
   a support base attached to said first end of said movable arm;
   said probe attached to said second end of said movable arm; and
   means for receiving said position signals from said transducer means and providing a digital coordinate corresponding to the position of said probe.

30. The method of claim 1 wherein said measurement feature comprises a hole in said equivalent.

31. The method of claim 6 wherein said measurement feature comprises a hole in said equivalent.

32. The method of claim 13 wherein said measurement feature comprises a hole in said equivalent.

* * * * *